United States Patent
Reeves

(10) Patent No.: US 6,211,778 B1
(45) Date of Patent: Apr. 3, 2001

(54) VEHICLE SAFETY SENSOR

(76) Inventor: Michael J. Reeves, 305 W. Air Depot Rd. Apt. 7k, Gadsden, AL (US) 35903

(*) Notice: Subject to any disclaimer, the term of this patent is extended or adjusted under 35 U.S.C. 154(b) by 0 days.

(21) Appl. No.: 09/395,433

(22) Filed: Sep. 14, 1999

Related U.S. Application Data

(60) Provisional application No. 60/100,207, filed on Sep. 14, 1998.

(51) Int. Cl.[7] ............................................. B60Q 1/00
(52) U.S. Cl. ...................... 340/436; 340/903; 340/942; 340/435; 340/943
(58) Field of Search ............................ 340/436, 903, 340/942, 435, 943

(56) References Cited

U.S. PATENT DOCUMENTS

| | | | |
|---|---|---|---|
| 4,920,520 | * | 4/1990 | Gobel et al. ........................ 367/99 |
| 5,028,920 | * | 7/1991 | Dombrowski ...................... 340/904 |
| 5,276,426 | * | 1/1994 | LoBello ............................. 340/436 |
| 5,281,947 | | 1/1994 | Durley et al. ..................... 340/433 |
| 5,315,285 | * | 5/1994 | Nykert .............................. 340/426 |
| 5,424,713 | * | 6/1995 | Thompson et al. ............... 340/436 |
| 5,574,426 | * | 11/1996 | Shisgal et al. ................... 340/435 |
| 5,710,553 | * | 1/1998 | Soares .............................. 340/903 |
| 5,712,640 | * | 1/1998 | Andou et al. ....................... 342/70 |
| 5,734,336 | * | 3/1998 | Smithline ......................... 340/903 |
| 5,767,793 | * | 6/1998 | Agravante et al. ............... 340/903 |

* cited by examiner

*Primary Examiner*—Daniel J. Wu
*Assistant Examiner*—Tai T. Nguyen
(74) *Attorney, Agent, or Firm*—Alston & Bird, LLP

(57) ABSTRACT

A vehicle safety sensor allows a vehicle operator such as a truck driver to detect the presence of adjacent objects in order to avoid collision with same. In one embodiment, three detection ranges providing feedback with various lights and sounds can be used with separate sensors, with some sensors automatically made "live" upon reversing or turning of the vehicle, and some sensors being manually activated, such as when a overpass is encountered.

15 Claims, 3 Drawing Sheets

VEHICLE SAFETY SENSOR

RELATED APPLICATIONS

This application claims the benefit and priority of pending provisional patent application Serial No. 60/100,207, filed Sep. 14, 1998.

TECHNICAL FIELD

The present invention relates to moving vehicles, and particularly relates to a sensor and method of using same which allows a vehicle operator to avoid potential accidents through the avoidance of obstacles which might otherwise go unseen.

BACKGROUND OF THE INVENTION

When a vehicle operator, particularly a large vehicle operator such as a truck driver, operates his or her particular vehicle, of paramount concern is the avoidance of accidents due to collision of the vehicle with other moving or stationary objects. While the prior art has attempted to address such concerns, there is always room for improvement.

SUMMARY OF THE INVENTION

The present invention overcomes deficiencies in the prior art by providing a method and apparatus for providing visual and/or auditory warning to a vehicle operator to allow same to avoid collisions.

Generally described, the present invention provides a method and apparatus which provides more than one different visual or auditory signal to the operator of a vehicle, depending upon the vicinity of a potential collision location.

More particularly described, the present invention provides a method and apparatus for assisting a vehicle operator in avoiding collisions, which includes both automatic and manual sensor energizement features.

Therefore it is an object of the present invention to provide an improved vehicle safety device.

It is a further object of the present invention to provide an improved vehicle safety sensor device which is easily read.

It is a further object of the present invention to provide an improved vehicle safety sensor device which is easily understood.

It is a further object of the present invention to provide an improved vehicle safety sensor device which is easily installed.

It is a further object of the present invention to provide an improved vehicle safety sensor device which can be manually energized.

It is a further object of the present invention to provide an improved vehicle safety sensor device which can be automatically energized.

It is a further object of the present invention to provide an improved vehicle safety sensor device which can be automatically energized upon the placement of the vehicle in reverse.

It is a further object of the present invention to provide an improved vehicle safety sensor device which can be automatically energized upon use of a vehicle turn signal.

It is a further object of the present invention to provide an improved vehicle safety sensor device which provides both visual and auditory warnings.

It is a further object of the present invention to provide an improved vehicle safety sensor device which allows for interaction with a computer such as a logging computer or other computer used with satellites.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, in which like numerals indicate like elements throughout the several views.

Figure 1:
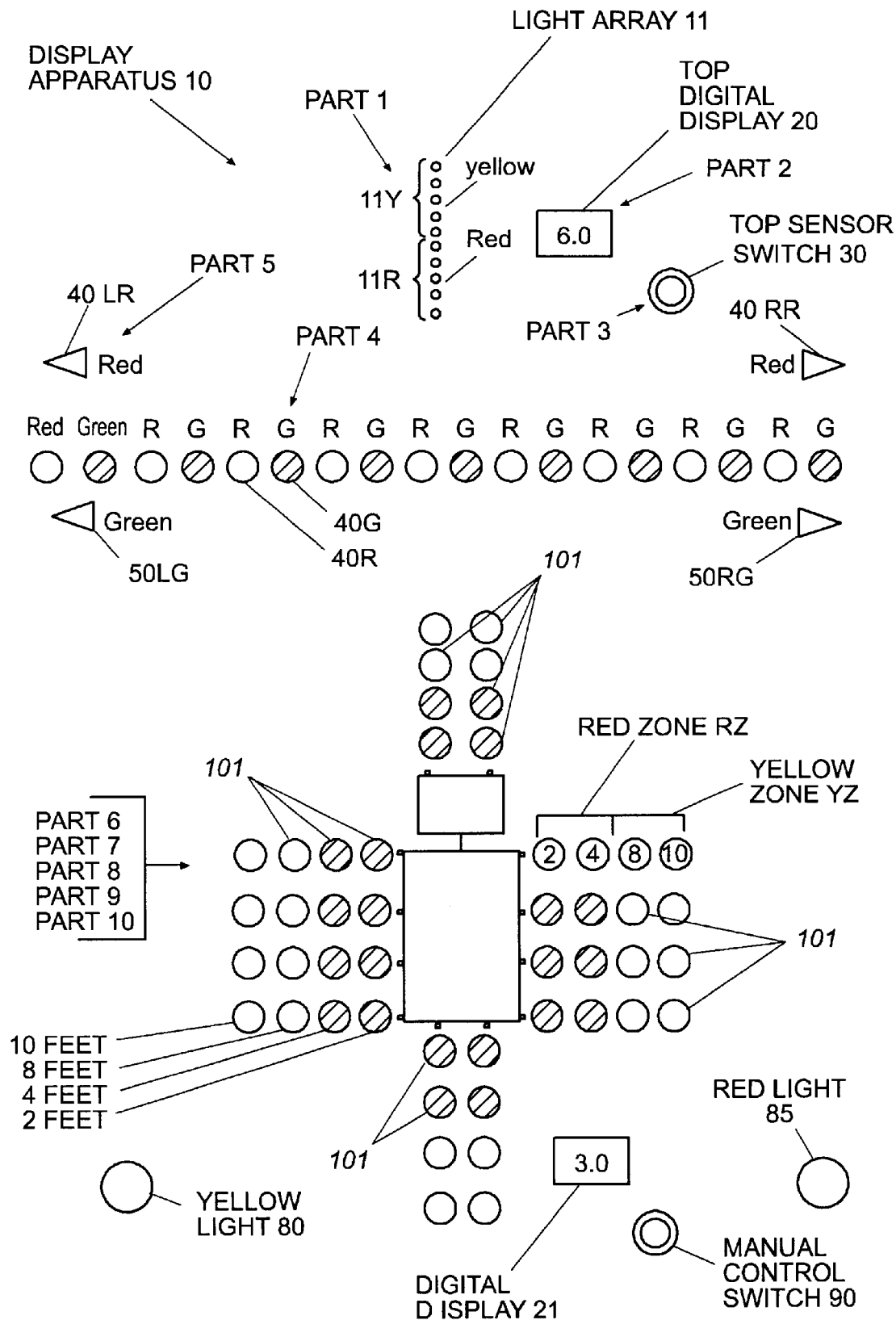
FIG. 1 is an illustrative view of a display configuration such as would be used in a display device in a conventional tractor-trailer environment.

Generally described, the present invention includes the use of a central display apparatus 10 (see FIG. 1) which operates in conjunction with one or more remote sensors 100. FIG. 1 is an illustrative view of a display configuration such as would be used in a display device in a conventional tractor-trailer environment.

The sensors sense the vicinity of foreign objects, so that the display apparatus, located near the driver, provides an adequate warning to a truck or other vehicle driver.

A display apparatus as shown in FIG. 1 is used which can include at least one meter that consists of lights and sound to alert the driver of the area in which there is an object or vehicle that he/she cannot see.

The display apparatus includes the following features:
light array 11Y (yellow)
light array 11R (red)
top digital display 20
digital display 21
top sensors switch 30
horizontal array of lights 40G, 40R
red indicators 40LR, 40RR
green indicators 50LG, 50RG
yellow light 80
red light 85
sensor lights 101
manual control switch 90

Figure 2:
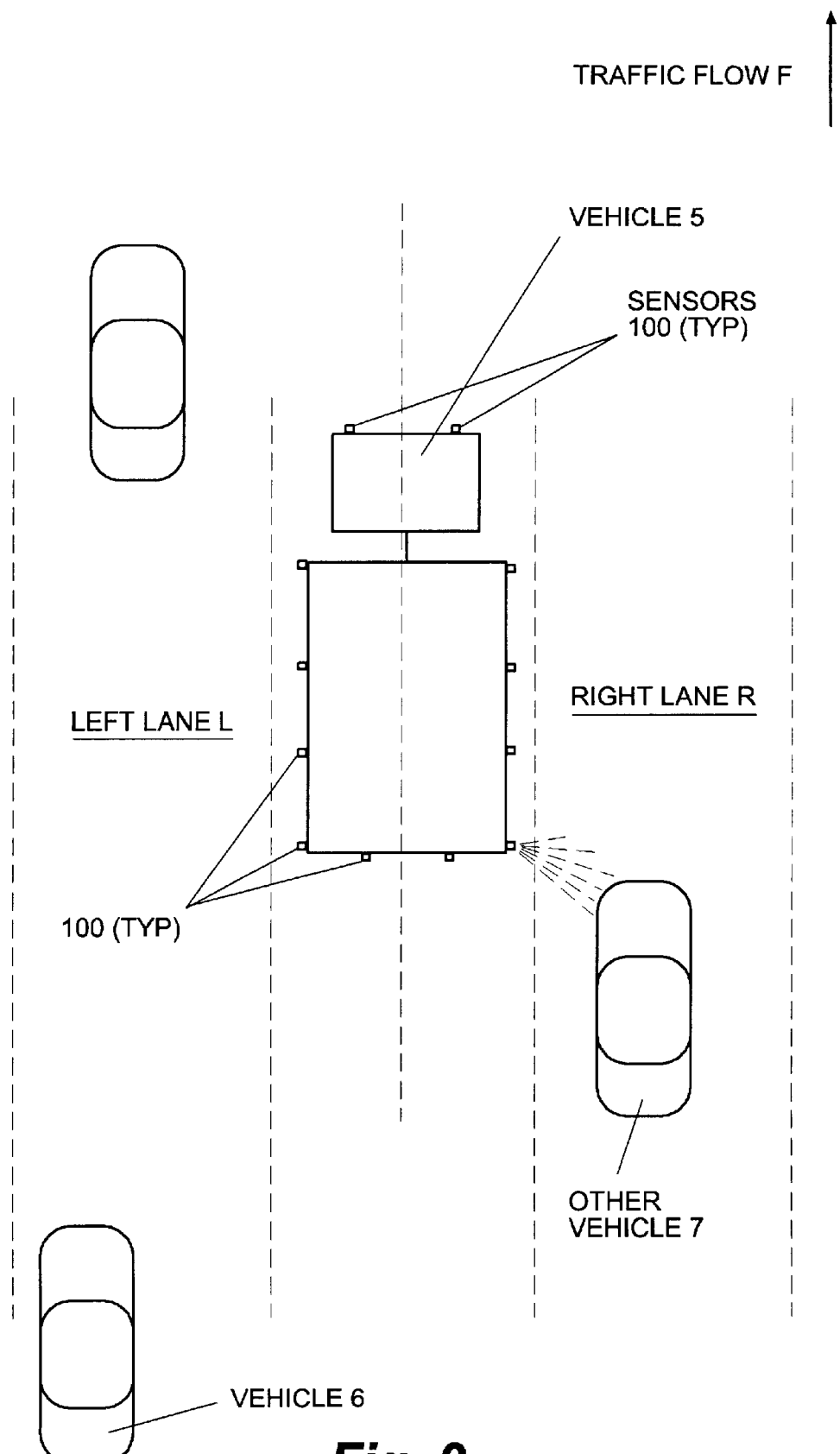
FIG. 2 is a view illustrating the sensors 100 on a vehicle 5 in a lane, said lane having a relatively left lane L and a relatively right lane R. Other vehicles 6 and 7 are shown in the left and right lanes, respectively. Other vehicle 7 is in the way of the vehicle 5 should it turn to right lane R.
Figure 3:
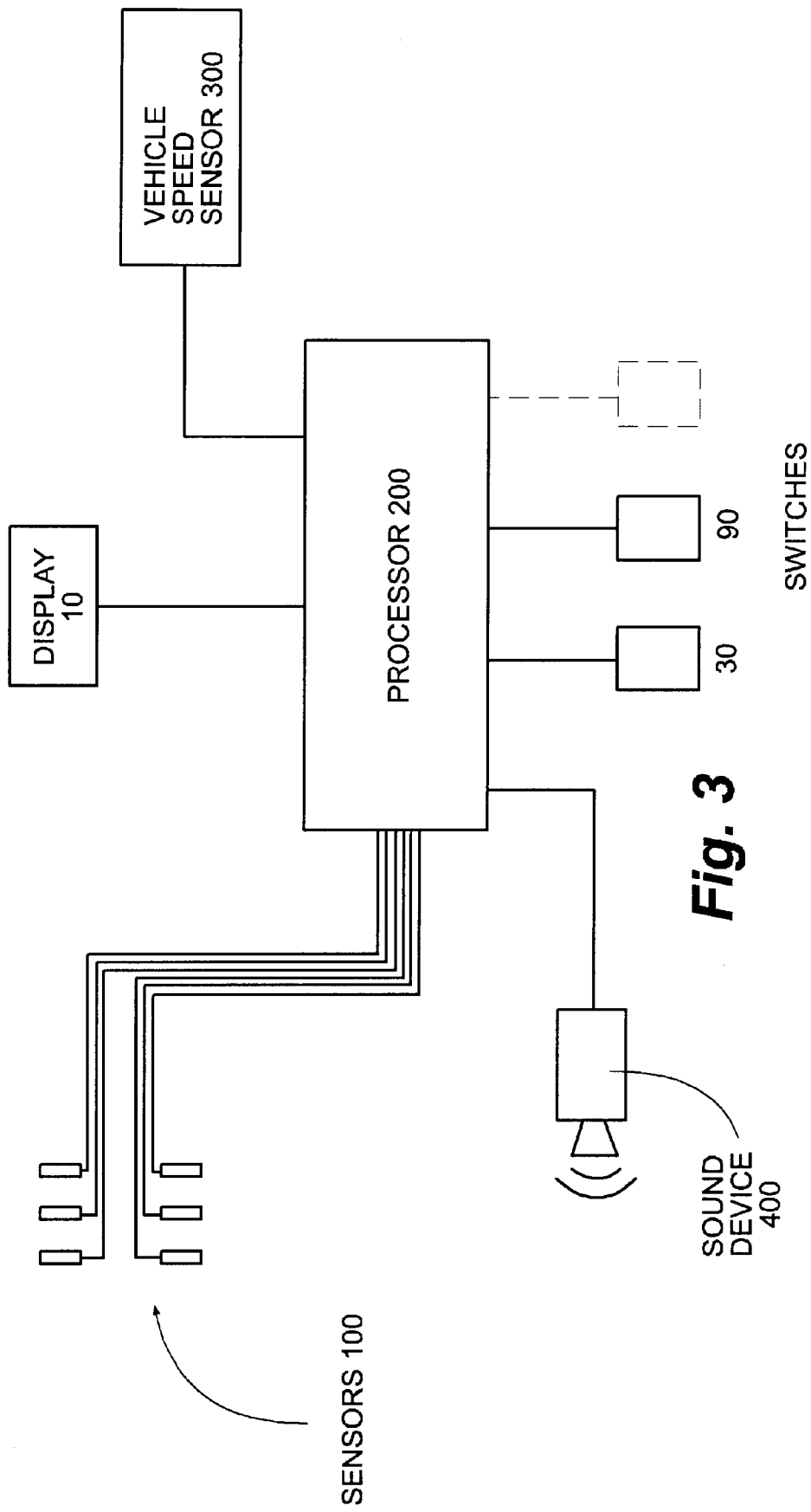
FIG. 3 is a diagrammatic view showing the relative instruction and logic paths of various elements used within the overall invention, including sensors 100, the display 10, vehicle speed sensor 300, a sound device 400, and switches 30, 90.

Distance proximity sensors 100 (see FIG. 2) such as known in the art can be located at various points on the tractor as well as the trailer to enhance the driver's awareness of vehicles and/or objects around him/her. Suggested placement of sensors will be, the rear of the vehicle, the right and left sides, and the top, front, and rear of the trailer. This is not the only locations the sensors can be located, these are the most critical areas. As discussed later in this application, the sensors on the front, (near the turn signals) sides, and rear cause lights 101 to light up either in the yellow zone (8 feet and 10 feet lights) or the red zone (2 feet and 4 feet lights)

For purposes of this discussion, the "energization" or "activation" of a sensor means it is being turned on so that sensing is possible; deactivation or "de-energizement" means it is being turned off so that sensing is not possible.

Individual features of the overall invention will now be discussed, generally grouped in "parts".

Top of Trailer

Part 1—This is a bead of blinking lights for the top of the trailer. These lights are yellow and red and come on when the sensors are manually activated and the top of the trailer is within a predetermined distance of an object. The yellow lights represent a caution, and is accompanied by a voice warning, alerting the driver of the object in the path of the top of the trailer. The red lights represent danger zone, and are accompanied by a voice command, alerting the driver to stop the vehicle before contact with the object.

Part 2—This is a digital display of the distance between the top of the trailer and the object being measured. The method of measurement can be variably determined in design, and can as known in the art.

Part 3—This represents the on and off switch for manual control for the sensors on the top of the trailer. This switch allows for selective manual control of the top sensors. The sensors can be placed on the top of the trailer as desired, but can be on the to front face, middle top face, and rear top face.

Lane Changing

Part 4—This represents a bead of red and green blinking lights. When the driver turns on his or her indicators to change lanes, the sensors on the side being turned to and the rear sensors will be activated. If all is clear, all of the green lights 40G (or, alternately, the half of the green lights on the side the driver is turning) will light up and blink with normal blinking sound. If there is an object in the predetermined zone, all of the red lights 40R (or alternately the half of the red lights on the side the driver is turning) will light up and blink rapidly and a voice command will alert the driver not to change lanes.

Part 5—This represents a red and green blinking arrow for each side of the tractor and trailer. When the driver turns on his or her indicator to change lanes, the sensors will be activated, if all is clear, the green arrow will blink with normal blinking sound. If there is an object in the predetermined zone, the red arrow will blink rapidly along with a rapid low pitch beeping sound, and a voice command will alert the driver not to change lanes. This works in conjunction with Part 4.

City Mode—Turns

Part 6—While maneuvering the truck through cities, an automatic city mode will be activated at a predetermined speed. When the turning indicators are turned on, city mode will detect objects on the side of the trailer in which the vehicle is turning. This will deactivate the previous voice command that detects objects while changing lanes on interstate at high speeds. Voice warning in conjunction with the red arrows 40RR and 40LR and red lights 40R will be activated when objects enter the red zone. The screen will automatically come on to show the driver the objects in the red zone. These objects will appear in red, in the lights 101, and digital display 21 will show the distance the closest remote object is from the trailer. When the vehicle accelerates to a predetermined speed, city mode will deactivate and voice command will reactivate for lane changing.

Maneuvering in Tight Places

Part 7—Before maneuvering the vehicle in tight places, press the manual switch 90 on the bottom of the screen to activate all sensors around the vehicle and turn the screen on. It may be noted that this time is the only time all the side sensors (not the top sensors) come on. Lights representing the object will appear in yellow and red as they enter the predetermined distance for each zone. These lights/objects will show individual digital distance by the digital display 21. When objects enter the yellow zone, the yellow light 80 at the bottom of the screen will also come on. When objects on the screen enter the red zone the voice warning will alert the driver that objects are in red zone. At a predetermined distance, red objects will rapidly blink and voice command will alert the driver to stop the vehicle. The red light 85 at the bottom of the screen will come on when the objects enter the red zone, and will also begin to blink rapidly when the object/lights blink.

Part 8—Built into VSS will be memory for storing information concerning the voice command mode. Once an object enters the voice command mode, VSS will document the speed, time, date, drivers code #, and place of possible impact, The device will work in conjunction with on-board computers such as those that so many companies are using to log their driver as well as with satellite systems used therewith. When a vehicle or object causes voice command mode, the "VSS" will send a signal to the trucks computer, that will log the time, date, mileage, location on the trailer and the drivers employee # (which will already be in the computer).

Backing

Part 9—When the vehicle is placed in reverse, the rear sensors will automatically be activated and the screen will come on. It may be noted that this and during the "tight places" mode and during "stop and go" mode are the only times these sensors come on. When an object enters a predetermined zone, a voice warning will alert the driver that objects are in the rear. Objects/lights will appear in red on the screen and the digital display 21 will show individual digital distance. If the objects enter a predetermined distance, voice command will alert the driver to stop, and will document the event into the VSS memory.

Stop and Go

Part 10—When the vehicle slows to a predetermined speed to zero mph, the sensors will be activated, voice warning will occur twice if an object is in the rear, within a certain distance. If the vehicle moves after stopped, or if the distance of the object behind changes, voice warning will occur again. This will eliminate the problem commercial vehicle drivers have while letting their foot relax on the brake while stopped on an up grade. The screen will automatically come on and display the object and it's digital distance when voice warning is activated. After the vehicle exceeds it's predetermined speed, the screen and the sensors will then go off. This will keep the driver aware of what is behind him in slow traffic areas.

Definitions

Voice Warning should be understood as a prescribed message alerting the driver that an object/s has entered into a predetermined distance between his/her vehicle and the object/s being measured. Messages may vary depending on the area of the vehicle that is being monitored.

Voice Command should be understood as a prescribed message commanding the driver to cease the action he/she is in the process of, (Ex. backing, lane changing, maneuvering, etc.) due to the possibility of contact with an object if the proceed. Messages may vary depending on the area of the vehicle that is being monitored.

Miscellaneous

Sensors shown on the drawing, are for example purposes only. The placement of sensors on the truck and trailer will be determined in design, as well as the distances for the predetermined zones, and the type of sensors to use.

Distances/Zones/Etc.

Some preferred distances/zones/etc. are as follows, although they should not be considered limiting or the only distances/zones/etc. used:

Top of Trailer—yellow zone, 6–12 inches. Red zone, 0–6 inches.

Lane Changing—6 feet range for all sensors on the turning side of the trailer, and the sensors on the back side of the tractor. If there is no object in the 6 ft. zone, the green lights will appear. If there is an object in the 6ft. zone, red lights, accompanied by voice command will alert the driver not to change lanes.

City Mode—Red zone, 3 feet.

Maneuvering—Yellow zone, 6 feet. Red zone, w/voice warning 4 ft. Red zone, w/voice command 18 inches.

Backing—Red zone w/voice warning, 8 feet. Red zone w/voice command 3 feet.

Stop and Go—Red zone w/voice warning 6 feet.

These distances have been determined with reaction time in mind.

The distances for the lights that represent objects on the screen can be variable in design, as well as the type of light to use, and the type of screen to use.

The type of device used to measure speed for parts 6 and 10 can be variable in design, but could be linked to the speedometer as known in the art.

Actual shape of the unit will be determined in design. One preferred shape of the unit is rectangular or square.

Other miscellaneous features may also be used with the present invention. As an example, a dimmer feature may be used which allows for dim or bright readouts from the device. Volume may also be controlled. An automatic signal may also be provided which indicates that one or more of the sensors is not working. The screen of the apparatus may show where the faulty sensor is.

The display device could be mounted on a swivel to allow for easy adjustment for viewing as desired. Finally, a decal (e.g. a rear decal) could be used which would indicate to the public that the vehicle was equipped with safety sensors for enhanced driver safety.

This device can also benefit smaller delivery trucks, not only tractor trailers.

A single sensor could be used to sense all the desired ranges (e.g. the three ranges), or separate sensors (e.g. three sensors) could be used to sense particular ranges.

EXAMPLES

The following are some examples of operation of the application.

Top of Trailer Example—Driver is coming upon an overpass, to safely judge the distance between the top of the trailer and the overpass, he manually activates the top sensors by turning them on (top sensor switch 30). The sensors will then measure the distance between the overpass and the top of the trailer, for the length of the trailer up to 12 inches. If the overpass is in the 12 inch zone, the yellow lights will come on, accompanied by a voice warning cautioning the driver of the object in the path of the trailer. At the same time, the driver will see the actual inches (from 12 to 1 inches) between the top of the trailer and the overpass on the digital display 20. As the driver precedes under the overpass, if he comes within a 6 inch zone, the red lights will light up, accompanied by a voice command, alerting the driver of the possibility of contact if he precedes. At this point, if the driver precedes, the computer will register a possible event on the top of the trailer. However, the driver still has a 6 inch clearance after the voice command, which can be monitored by the digital display 20.

Lane Changing Example—Driver is traveling interstate, he turns on his right indicator. At this point, the sensors for the right side of the truck are activated. If there is no object in the 6ft. zone, the green bead of lights, and the green blinker light on the right side of the screen will blink with normal blinking sound, if there is an object in the 6ft. zone, the red bead of lights, and the red blinker on the right side will light up accompanied by a low pitched beeping and voice command alerting the driver not to change lanes.

Backing Example—Driver in backing into a loading dock or door. When the drive places the vehicle in reverse, the sensors on the back of the truck, the sensors will be activated. When the drive comes within 8 ft. of the dock or door, the screen will come on, showing a red light or diode in the rear of the truck, (which represents the object being measured) and the digital display 21 will show the footage from the truck to the dock or door. A large blinking light at the bottom of the screen will also come on. As the drive continues to approach the dock or door, when he comes within 3 ft. of the dock or door, he will then see a red diode or light that represents the dock or door at 3 ft. and will hear a voice command alert him to stop the truck before contact is made. He may then monitor footage by the digital display 21.

Conclusion

Therefore it may be seen that the present invention provides an improvement over the prior art by providing a vehicle safety sensor system which includes a display device which operates in conjunction with at least one sensor device.

While this invention has been described in specific detail with reference to the disclosed embodiments, it will be understood that many variations and modifications may be effected within the spirit and scope of the invention as described in the appended claims.

I claim:

1. A vehicle safety system, said system for use with a vehicle for use by an operator on a roadway, said vehicle having turn signal indicators for allowing said operator to indicate intentions for left and right turns, said vehicle safety system comprising:

at least one presence sensor attached proximate at least one side of said vehicle for sensing the presence of a remote object a distance beside said vehicle and for providing a presence sensor signal if such an object is sensed;

a signal processing and generating unit for receiving and processing said sensor signal from said presence sensor and generating an advisory signal to said operator in response to said receipt of said presence sensor signal by said unit; and a switch having an ON and an OFF position, said switch being operably associated with said vehicle turn signal indicators, said ON position allowing an advisory signal to reach said operator if an object is sensed by said presence sensor, and said OFF position not allowing said advisory signal to reach said operator despite the presence of said same object, said switch being placed in its ON position when said operator activates at least one said turn signal indicator and OFF when said turn signal indicator is deactivated.

2. The vehicle safety system of claim 1, wherein said advisory signal includes a visual warning which can be seen by said operator.

3. The vehicle safety system of claim 2, wherein said advisory signal also includes an audible warning signal.

4. The vehicle safety system of claim 3, wherein said audible warning signal simulates a human voice advising said operator not to change lanes.

5. A vehicle safety system, said system for use with a vehicle for use by an operator on a roadway, said vehicle safety system comprising:
- at least one presence sensor attached proximate the side of said vehicle for sensing the presence of a remote object a distance beside said vehicle and for providing a presence sensor signal if such an object is sensed;
- at least one speed sensor for determining the speed of said vehicle and for providing a low speed signal when said speed has fallen below a predetermined value; and
- a signal processing and generating unit for processing said signals from both said presence sensor and said speed sensors, said unit configured for selectively generating an advisory signal to said operator in response to receipt by said unit of said presence sensor signal, said unit selectively allowing said generated advisory signal to reach said operator in response to said low speed signal from said low speed sensor being received by said unit.

6. The vehicle safety system as claimed in claim 2, wherein when said vehicle is in said NORMAL MODE, a first advisory signal is given for a first event and a second advisory signal is given for a second event, and when said vehicle is in said CITY MODE, a second advisory signal is not given, and said first advisory signal is given for said second event.

7. A vehicle safety system, said system for use with a vehicle for use by an operator on a roadway, said vehicle safety system comprising:
- at least one presence sensor attached proximate the side of said vehicle for sensing the presence of a remote object a distance beside said vehicle and for providing a sensor signal if such an object is sensed;
- at least one speed sensor for determining the speed of said vehicle and for providing a low speed signal when said speed has gone below a predetermined value; and
- a signal processing and generating unit for processing said signals from said two sensors and generating two modes of advisory signals to said operator depending on whether or not said low speed signal is received by said processing unit, a CITY MODE if said low speed signal is received by said processing unit, and a NORMAL MODE if said low speed signal is not received by said processing unit.

8. The vehicle safety system as claimed in claim 7, wherein said first advisory signal, given for said first event, is a Voice Warning, and said second advisory signal signal, given for said second event, is a Voice Command.

9. A vehicle safety system, said system for use with a vehicle for use by an operator on a roadway, said vehicle safety system comprising:
- a plurality of presence sensors attached proximate at least two sides of said vehicle, each sensor configured for sensing the presence of a remote object a distance from said vehicle and for providing a sensor signal if such an object is sensed;
- a signal processing and generating unit for processing said signals from said sensors and generating an advisory signal to said operator in response to one or more sensor signals; and
- a manual switch having an ON and an OFF position for use by said operator, said manual switch configured when in said ON position to allow said operator to allow for continuous sensing by said presence sensors and for generation of said advisory signal to said operator in response to said sensor signal, and said manual switch configured when in said OFF position to prevent generation of said advisory signal or to preclude any sensor signal.

10. A vehicle safety system, said system for use with a vehicle for use by an operator on a roadway, said vehicle safety system comprising:
- a presence sensor attached proximate the exterior of said vehicle, said sensor configured for sensing the presence of a remote object a distance from said vehicle and for providing a sensor signal if such an object is sensed;
- a signal processing and generating unit for processing said signals from said presence sensor and generating an advisory signal to said operator in response to said presence sensor signal; and
- a memory storage device for storing said logging a plurality of advisory signals for later review.

11. A vehicle safety system, said system for use with a vehicle for use by an operator on a roadway, said vehicle safety system comprising:
- at least one presence sensor attached proximate the side of said vehicle for sensing the presence of a remote object a distance beside said vehicle and for providing a presence sensor signal if such an object is sensed;
- at least one direction sensor for determining the direction of said vehicle and for providing a reverse direction signal when said vehicle is moving in reverse;
- a signal processing and generating unit for processing said signals from said two sensors and generating two modes of advisory signals to said operator depending on whether or not said reverse direction signal is received by said unit, a REVERSE MODE if said reverse direction signal is received by said unit, and a NORMAL MODE if said reverse direction signal is not received by said unit.

12. The vehicle safety system as claimed in claim 11, wherein said sensor is located on the rear of said vehicle, and wherein a simulated voice command is provided in response to a particular event only in said REVERSE MODE.

13. A vehicle safety system, said system for use with a vehicle for use by an operator on a roadway, said vehicle having a turn signal indicator, said vehicle safety system comprising:
- at least one presence sensor attached proximate the side of said vehicle for sensing the presence of a remote object a distance beside said vehicle and for providing a presence sensor signal if such an object is sensed;
- at least one speed sensor for determining the forward speed of said vehicle and for providing a low forward speed signal when said speed has gone below a predetermined value;
- at least one at least one direction sensor for determining the direction of said vehicle and for providing a reverse direction signal when said vehicle is moving in reverse;
- a signal processing and generating unit for processing said signals from said sensors and generating an advisory signal to said operator in response to said sensor signal, and for processing said signals from said sensors and generating various modes of advisory signals to said operator depending on whether or not said low forward speed signal is received by said unit and depending on whether or not said reverse direction signal is received by said unit, said various modes including a CITY MODE if said low forward speed signal is received, a REVERSE MODE if said reverse direction signal is received, and a NORMAL MODE if said low speed signal is not received and said reverse direction signal is not received;

a turn switch having an ON and an OFF position, said ON position allowing an advisory signal to reach said operator if an object is sensed by said presence sensor, and said OFF position not allowing said advisory signal to reach said operator despite the presence of said same object, said switch being placed in its ON position when said operator activates said turn signal indicator and OFF when said turn signal indicator is deactivated;

a manual switch having an ON and an OFF position for use by said operator, said manual switch configured when in said ON position to allow said operator to allow for continuous sensing by said presence sensors and for generation of said advisory signal to said operator in response to said sensor signal, and said manual switch configured when in said OFF position to prevent generation of said advisory signal or to preclude any sensor signal; and a memory storage device for storing said logging a plurality of advisory signals for later review.

14. The vehicle safety system as claimed in claim 13, wherein when said vehicle is in said NORMAL MODE, a first advisory signal is given for a first event and a second advisory signal is given for a second event, and when said vehicle is in said CITY MODE, a second advisory signal is not given, and a first advisory signal is given for a second event.

15. The vehicle safety system as claimed in claim 14, wherein said first advisory signal is a Voice Warning, and where in said second advisory signal is a Voice Command.

* * * * *

UNITED STATES PATENT AND TRADEMARK OFFICE
CERTIFICATE OF CORRECTION

PATENT NO. : 6,211,778 B1
DATED : April 3, 2001
INVENTOR(S) : Reeves

It is certified that error appears in the above-identified patent and that said Letters Patent is hereby corrected as shown below:

Title page,
Item [76], Inventor's address, "305 W. Air Depot Rd. Apt. 7k, Gadsden, AL (US) 35903" should read -- 69 Jones Sawmill Rd., Attalla, AL 35954 --.
Item [56], References Cited, U.S. PATENT DOCUMENTS, Line 5, "Nykert" should read -- Nykerk --.
Item [74], in the firm name, cancel the comma (,).
Item [57], ABSTRACT, last line, "a" should read -- an --.

Column 7, claim 6,
Line 25, "claims 2" should read -- claim 7 --.

Column 7, claim 8,
Line 52, cancel "signal", second occurrence.

Column 8, claim 13,
Line 57, cancel "at least one", second occurrence.

Signed and Sealed this

Fourth Day of December, 2001

Attest:

NICHOLAS P. GODICI
*Attesting Officer*     *Acting Director of the United States Patent and Trademark Office*